US008699764B2

(12) United States Patent
Vitt et al.

(10) Patent No.: US 8,699,764 B2
(45) Date of Patent: Apr. 15, 2014

(54) AUTOMATED BIOMETRIC SUBMISSION AND IMPROVED SCANNING SYSTEM AND METHOD

(75) Inventors: Joan L. Vitt, Parsons, KS (US); Derald E. Caudle, Pittsburg, KS (US)

(73) Assignee: AFIX Technologies, Inc., Pittsburg, KS (US)

(*) Notice: Subject to any disclaimer, the term of this patent is extended or adjusted under 35 U.S.C. 154(b) by 318 days.

(21) Appl. No.: 13/095,601

(22) Filed: Apr. 27, 2011

(65) Prior Publication Data

US 2012/0106807 A1 May 3, 2012

Related U.S. Application Data

(60) Provisional application No. 61/328,305, filed on Apr. 27, 2010.

(51) Int. Cl.
*G06K 9/00* (2006.01)

(52) U.S. Cl.
USPC ............................. 382/125; 382/124; 382/115

(58) Field of Classification Search
None
See application file for complete search history.

(56) References Cited

U.S. PATENT DOCUMENTS

| | | | |
|---|---|---|---|
| 3,558,864 A | 1/1971 | French | |
| 3,699,519 A | 10/1972 | Campbell | |
| 3,893,080 A | 7/1975 | Ho et al. | |
| 4,015,240 A * | 3/1977 | Swonger et al. | 382/125 |
| 4,156,230 A | 5/1979 | Riganati et al. | |
| 4,210,899 A | 7/1980 | Swonger et al. | |
| 4,310,827 A | 1/1982 | Asai | |
| 4,696,046 A | 9/1987 | Schiller | |
| 4,747,147 A | 5/1988 | Sparrow | |
| 4,790,564 A | 12/1988 | Larcher et al. | |
| 4,817,183 A | 3/1989 | Sparrow | |
| 4,896,363 A | 1/1990 | Taylor et al. | |
| 4,944,021 A | 7/1990 | Hoshino et al. | |
| 4,947,442 A | 8/1990 | Tanaka et al. | |
| 4,947,443 A | 8/1990 | Costello | |
| 5,040,223 A | 8/1991 | Kamiya et al. | |
| 5,040,224 A | 8/1991 | Hara | |
| 5,067,162 A | 11/1991 | Driscoll, Jr. et al. | |
| 5,105,467 A | 4/1992 | Kim et al. | |
| 5,109,428 A | 4/1992 | Igaki et al. | |
| 5,187,747 A | 2/1993 | Capello et al. | |
| 5,239,590 A | 8/1993 | Yamamoto | |
| 5,420,937 A | 5/1995 | Davis | |

(Continued)

OTHER PUBLICATIONS

NPL—Adobe Photoshop CS2 Brochure, 2005, p. 1-5.*

(Continued)

*Primary Examiner* — Jason M Repko
*Assistant Examiner* — Ha Le
(74) *Attorney, Agent, or Firm* — Law Office of Mark Brown, LLC; Mark E. Brown; Christopher M. DeBacker

(57) ABSTRACT

An automated biometric submission and scanning system includes a scanner adapted for creating digital image files corresponding to biometrics, such as fingerprints. A computer, which can be standalone or linked to a network, receives the scanner output. The computer is programmed with an image enhancement program, which transforms the biometric image to an appropriate format for searching in one or more biometrics databases. An automated biometric submission and scanning method includes the steps of scanning a biometric image, enhancing the scanned image file, running a biometrics tracking program, selecting a biometrics database, complying with the database submission standards and submitting a biometrics database search.

2 Claims, 3 Drawing Sheets

(56) References Cited

U.S. PATENT DOCUMENTS

| | | | |
|---|---|---|---|
| 7,613,929 B2 | 11/2009 | Cohen et al. | |
| 8,036,431 B1* | 10/2011 | Fisher et al. | 382/115 |
| 2004/0167929 A1* | 8/2004 | Osborne et al. | 707/104.1 |

OTHER PUBLICATIONS

NPL, Jiang et al, Fingerprint Minutiae Matching Based on the Local and Global Structures, IEEE Pattern Recognition Proccedding 2000, p. 1038-1041, Published 2000.*

NPL, Department of Justice Federal Bureau of Investigation, Electronic Fingerprint Transmission Specification (EFTS), Published May 2005. p. 1-216.*

NPL, Mitretek, George Kiebuzinski, How AFIS Selection Was Performed for IAFIS, published Apr. 6, 2006, p. 1-20.*

"AFIX Products Overview", http://www.afixtechnologies.com/newsite2006/afix-products.html, Nov. 2006.

"AFIX VP", http://www.afix.net/newsite2006/afix-vp.html, Nov. 2006.

Aware.Com, "NITSPack Sdk Brochure", (Aug. 2007, 1 Page).

Microsoft_Office_Visio_Professional_2007 (Getting started screen), 1 Page.

Reddy, Saveen, "Visio/IronPython/Powershell—How to draw nice diagrams from the command line", (2009, pp. 1-11).

http://blogs.msdn.com/b/saveenr/archive/2009/01/22/visio-ironpython-powershell-how-to-draw-nice-diagrams-from-the-command-line.aspx, (Jan. 2, 2009).

* cited by examiner

AUTOMATED BIOMETRIC SUBMISSION AND IMPROVED SCANNING SYSTEM AND METHOD

CROSS-REFERENCE TO RELATED APPLICATION

This application claims priority in U.S. patent application Ser. No. 61/328,305, filed Apr. 27, 2010, and is related to AUTOMATED BIOMETRIC IDENTIFICATION SYSTEM (ABIS) AND METHOD, U.S. patent application Ser. No. 13/412,512, filed Mar. 5, 2012, which claims priority in U.S. Provisional Patent Application Ser. No. 61/448,972, filed Mar. 3, 2011, and is also related to GEO-LOCATION VIDEO ARCHIVE SYSTEM AND METHOD, U.S. patent application Ser. No. 13/412,359, filed Mar. 5, 2012, which claims priority in U.S. Provisional Patent Application Ser. No. 61/448,997, filed Mar. 3, 2011, all of which are incorporated herein by reference.

BACKGROUND OF THE INVENTION

1. Field of the Invention

The present invention relates generally to physiological biometrics, including automated fingerprint/palm print identification systems (AFISs), and in particular to a system and method for improving the method for scanning fingerprints and reducing the user-side management load for submitting digital fingerprints to major AFISs.

2. Description of the Related Art

Physiological biometric data is used in forensic science to identify suspects, victims and other persons. For example, fingerprints collected from a crime scene, or from items of evidence from a crime, can be used to determine who touched the surface in question. Fingerprints are the primary source of physiological biometric data used for identification purposes today. Fingerprint identification emerged as an important system within various law enforcement agencies in the late 19th century. This system replaced anthropometric measurements as a more reliable method for identifying persons having a prior record, often under an alias name, in a criminal record repository. The science of fingerprint identification stands out among all other forensic sciences for many reasons, including its superiority and reliability.

Fingerprint identifications produce more positive identifications of persons worldwide daily than any other human identification procedure. For example, U.S. Government departments and agencies identify over 70,000 persons daily, mostly with AFIS. A large percentage of these identifications, including approximately 92% of US Visit identifications, are affected in "lights-out," fully-automated computer identification processes with high levels of successful identifications, i.e., "matches," typically using only two fingerprints.

Fingerprint identification is the process of comparing questioned and known friction skin ridge impressions (e.g. minutiae) from fingers or palms or even toes to determine if the impressions are from the same finger or palm. The flexibility of friction ridge skin means that no two finger or palm prints are ever exactly alike, i.e. identical in every detail; even two impressions recorded immediately after each other. Fingerprint identification occurs when an expert or computer system determines that two friction ridge impressions originated from the same finger, palm, toe, etc., to the exclusion of all others.

A known print is the intentional recording of the friction ridges, usually with black printers ink rolled across a contrasting white background, typically a white card. These cards can be scanned and the fingerprints digitally uploaded from the scanned images. Friction ridges can also be recorded digitally using the Live Scan system adopted and required by the U.S. Department of Defense (DoD). A latent print is the chance reproduction of the friction ridges deposited on the surface of an item. Latent prints are often fragmentary and may require chemical methods, powder, or alternative light sources in order to be visualized.

When friction ridges come in contact with a surface that is receptive to a print, material on the ridges, such as perspiration, oil, grease, ink, etc. can be transferred to the item. The factors which affect friction ridge impressions are numerous, thereby requiring fingerprint examiners to undergo extensive and objective study in order to be trained to competency. Pliability of the skin, deposition pressure, slippage, the matrix, the surface, and the development medium are just some of the various factors which can cause a latent print to appear differently from the known recording of the same friction ridges. Indeed, the conditions of friction ridge deposition are unique and never duplicated. This is another reason why extensive and objective study is necessary for examiners to achieve competency.

Existing AFIS hardware and software automatically authenticate and identify individuals using their fingerprints. Search programs such as the Tracker program line by AFIX Technologies, Inc. of Pittsburgh, Kans. can be used to take a fingerprint image and conduct a search from a major database. A fingerprint of a person comprises a distinctive and unique ridge pattern structure. For authentication or identification purposes, this ridge pattern structure can be characterized by endings and bifurcations of the individual ridges. These features are known as minutiae. Automatic authentication systems include the DoD Automatic Biometric Identification System (ABIS), which is able to search all ten finger positions, and the Federal Bureau of Investigation (FBI) Integrated Automated Fingerprint Identification System (IAFIS). These databases contain large numbers of known prints. In order for a forensic fingerprint scanning system to be able to submit latent submissions to either the ABIS or the IAFIS, certain qualifications must be met.

The primary features required of forensic fingerprint scanning and submission systems for DoD ABIS submissions of latent prints are compliance standards, including file format, image size, image quality, and other requirements. The DoD ABIS now requires Live Scan electronic fingerprint scanning for fingerprint scan submissions in place of the more traditional ink and paper. Using the Live Scan AFIS for identification purposes instantly compares the scanned fingerprints of an individual with the connected national database.

Likewise, IAFIS systems have their own requirements for submission, including the "penetration value," which is an estimation of the amount of the database's total number of records to be searched. Search limiters are placed upon all searches (e.g., finger position, sex and age) in order to reduce the estimated number of records searched. Proper search limiting can reduce the number of records searched to below 30% penetration value of the total database population. However; with latent fingerprints much of this limiting information is unknown, and as such forensic examiners often submit multiple searches to IAFIS systems with only certain finger positions selected, which increases the load on the IAFIS database. A common practice for reducing the search population is to send a separate e-mail for each finger and thumb, resulting in the submission of five e-mails in order to create a penetration of 20% for each submission. The problem is that this practice results in the search operator performing multiple searches for a single identification. A tremendous amount of file management on both ends of a latent fingerprint search is required, and until now this problem has yet to be effectively addressed.

The methods of U.S. Pat. No. 5,420,937, which is assigned to a common assignee and is incorporated herein by reference, provide additional relevant background regarding AFIS systems and methods commonly used to search major fingerprint database records to find results, and also provides a unique and useful approach to performing such a search within a fingerprint database.

SUMMARY OF THE INVENTION

In the practice of the present invention, a minutiae-to-minutiae ridge count method for reading a fingerprint image is performed, followed by a search of major national biometric databases with increased efficiency and decreased amount of necessary work performed by the user. The method addresses file management issues common in IAFIS databases, allows for a variety of user-defined file format types in order to satisfy the DOD ABIS systems strict standards, and greatly simplifies the user-side input allowing for simple and fast fingerprint scanning, uploading, searching, and verification.

BRIEF DESCRIPTION OF THE DRAWINGS

The drawings constitute a part of this specification and include exemplary embodiments of the present invention and illustrate various objects and features thereof.

DETAILED DESCRIPTION OF THE PREFERRED EMBODIMENTS

I. Introduction and Environment

As required, detailed aspects of the disclosed subject matter are disclosed herein; however, it is to be understood that the disclosed aspects are merely exemplary of the invention, which may be embodied in various forms. Therefore, specific structural and functional details disclosed herein are not to be interpreted as limiting, but merely as a basis for the claims and as a representative basis for teaching one skilled in the art how to variously employ the present invention in virtually any appropriately detailed structure.

Certain terminology will be used in the following description for convenience in reference only and will not be limiting. For example, up, down, front, back, right and left refer to the invention as orientated in the view being referred to. The words, "inwardly" and "outwardly" refer to directions toward and away from, respectively, the geometric center of the aspect being described and designated parts thereof. Said terminology will include the words specifically mentioned, derivatives thereof and words of similar meaning.

Fingerprint identification uses a method of scanning images of fingerprints (or the finger containing the print itself), clearing up the scanned image with an image editing program, locating identifying minutiae including ridge bifurcations and end points, and then identifying the person to whom the fingerprint belongs. The more information sent to the common databases the more likely a correct result will be returned quickly.

Figure 1:
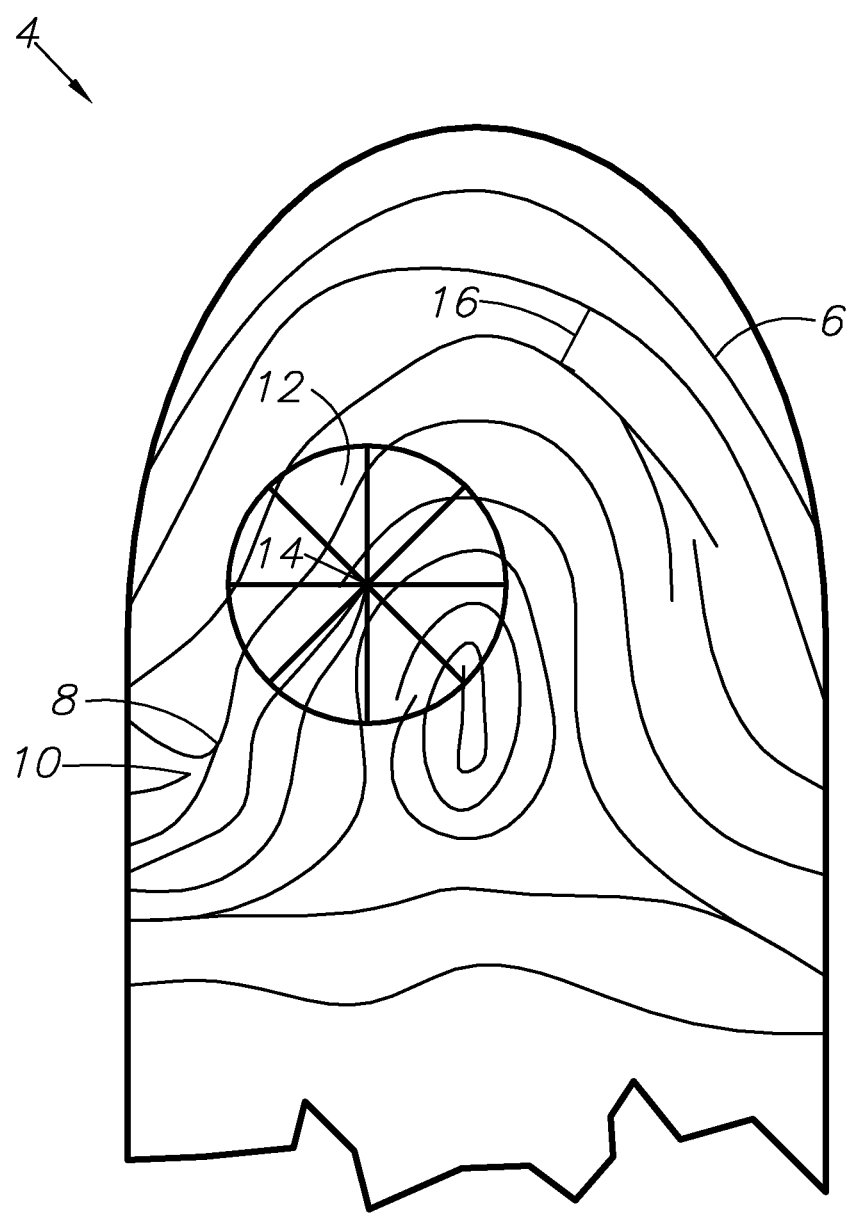
FIG. 1 is a diagram of the tip of a finger showing a common fingerprint represented by ridges.

II. Preferred Embodiment or Aspect of the Biometric Scanning and Submitting System and Method The preferred embodiment of the present invention is a modification to existing software techniques with the goal of streamlining the identification process through the use of fingerprints. This includes a system for scanning fingerprints, editing the scanned images, and uploading said images to a database to search for the owner of the original fingerprint. Existing software includes programs such as the Tracker software created by AFIX Technologies, Inc. of Pittsburgh, Kans. A preferred embodiment of the forensic fingerprint scanning system 2 is generally comprised of a fingerprint left by a finger 4 as shown in FIG. 1, containing ridges 6, which include minutiae such as bifurcation ridges 8 and ridge endpoints 10, a scanning system 22, an image editing program 50, and a computer program for editing and searching existing fingerprint databases.

The preferred embodiment of the present invention uses a minutiae-to-minutiae ridge count method for generating identification information from a fingerprint. FIG. 1 shows a finger 4 with a fingerprint made of ridges 6 and minutiae 8, 10. The method used by the present invention locates each minutiae, which may be a ridge bifurcation minutiae 8 or a ridge endpoint 10, selects one target minutiae 14 at a time, and then branches out in directions dividing the print into multiple (e.g., 8) neighboring segments 12. The nearest neighboring minutiae 8 or 10 in each of the eight neighbor segments 12 to the target minutiae 14 is tagged in relation to the target minutiae, and the data is stored and used later for identification purposes. If no neighboring minutiae can be found within fourteen ridge counts 16, then that information is also tagged and recorded with reference to the target minutiae.

This information is recorded for each minutiae on the fingerprint. Such minutiae and minutiae neighbor data can be stored for identification purposes. No two persons have the same fingerprint, and as such no two persons' prints will result in an identical network of coordinate systems used for identification purposes. As described below, that data is then stored into an appropriate data file format and submitted to a national fingerprint database for identification purposes.

Figure 2:
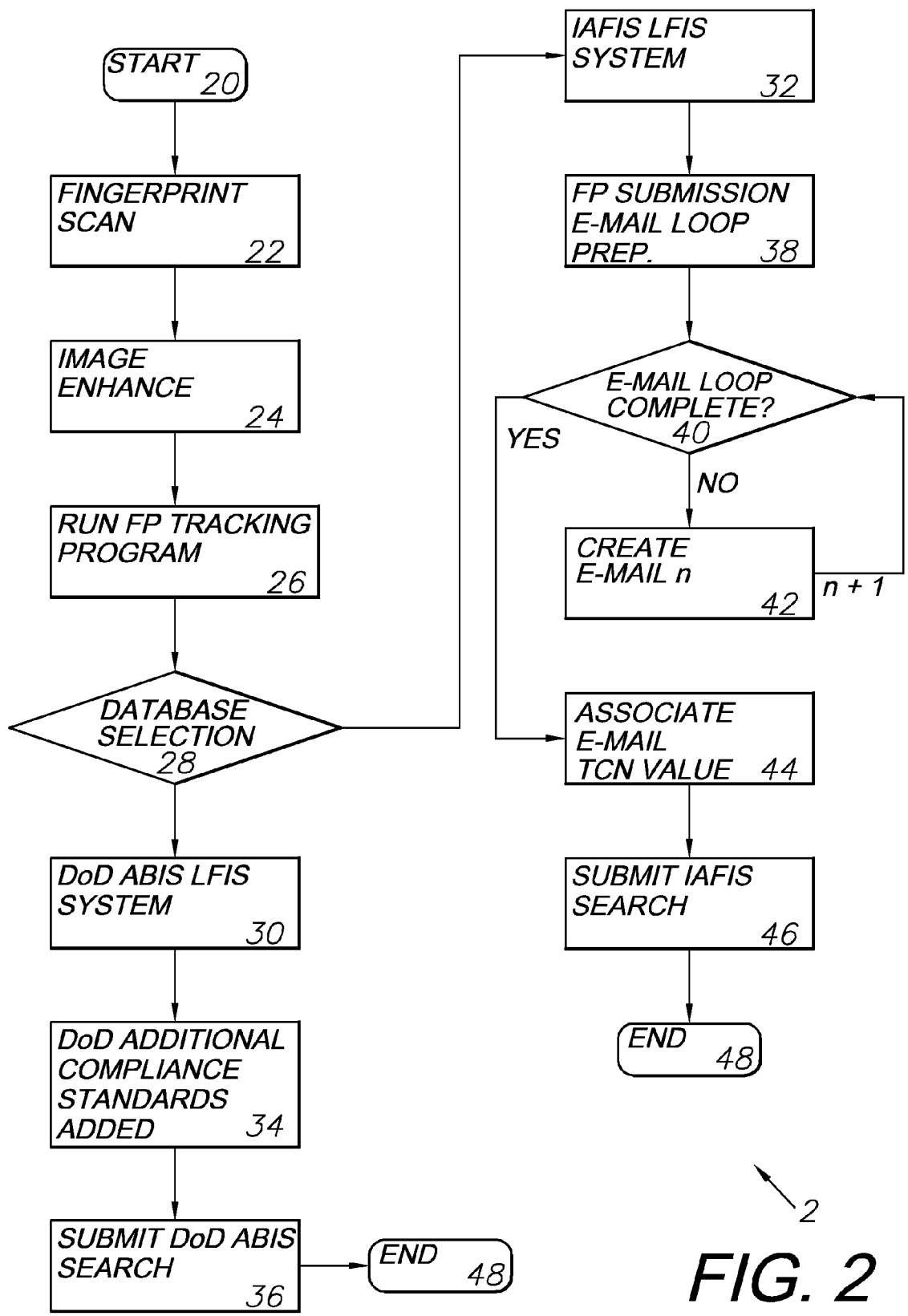
FIG. 2 is a flowchart for the method of the present invention demonstrating the step-by-step method by which a fingerprint is submitted to a database for identification.

FIG. 2 is a flow chart diagramming the step-by-step method of a single-click latent submission system which determines whether to submit a search to the DoD ABIS system or to the FBI IAFIS system, or both. Once a fingerprint is obtained, the first step is to start the process at 20. The obtained fingerprint is scanned at 22 using a preferred scanning method. The image may then be enhanced through an image enhancement at 24, as described in more detail below. Once the image is scanned, re-touched, and saved in a correct file format, the fingerprint tracking program of the preferred embodiment of the present invention is run at 26. The scanned and edited fingerprint image is uploaded into the program, and at 28 a database must be selected. Different criteria must be met depending on the database selected. As a default, the image scanning program 50, described in detail below, will save the scanned and edited fingerprint image into a format that will satisfy IAFIS systems. If the DoD ABIS database is chosen instead, additional compliance standards must be met.

If the DoD ABIS LFIS system is chosen, the program advances down the path at 30, and additional compliance standards are added at 34. These standards are listed in the Department of Defense Electronic Biometric Transmission Specifications (EBTS) document published on Nov. 8, 2006 (version 1.2). The preferred embodiment of the forensic fingerprint scanning system 2 will automatically generate all image, data, and file type requirements listed under the DoD EBTS and output the search to the DoD via the preset e-mail address at 36. The process then ends at 48. DoD ABIS systems accept a single latent send with the ability to search all ten finger positions at the same time. However, the strict standards adopted by the DoD must be met before latent submissions are allowed. The preferred embodiment of the present invention is designed to comply with such compliance standards. Submissions to the DoD ABIS LFIS will initially have FBI compliance standards applied as a default setting, and additionally will apply DoD ABIS standards as outlined in the DoD EBTS mentioned above.

Alternatively or concurrently, the scanned fingerprint(s) may be selected to be sent to IAFIS systems, whereby the program 2 proceeds down the path at 32. Although the FBI IAFIS criteria standards for data file type and image type are the default output of the scanning program 50, the IAFIS system allows each latent submitted to automatically generate five e-mails in a preparation step at 38 in order to meet the 30% penetration value required by IAFIS systems in order to limit the size of the search on the database side. Each of the separate five e-mails includes the print from each of the four fingers and thumbs of both hands (e.g. E-mail #1 includes the right and left thumb; E-mail #2 includes the right and left index finger). The system performs a logic loop consisting of a loop check at 40 and an e-mail creation step at 42, depending on the number of prints actually scanned into the system. Once all scanned prints have been added to separate e-mails, the search is associated with an e-mail transaction control number (TCN) value at 44 and the search is submitted at 46 to the IAFIS and the process ends at 58. The addition of dividing the scanned fingerprint data into five e-mails increases the likelihood of a correct match being found, and at the very least ensures a 30% penetration value which reduces database-side file management issues. The fact that the same program used to upload the fingerprint images is also used to generate the separate e-mails saves user-end time and creates a more efficient search method.

The five e-mails submitted to the IAFIS will all be placed under a single parent TCN value so that they will continue to be associated with one another after their return results from IAFIS are complete. An onscreen status bar will inform the user of the percentage of returned results as they are reported (e.g. 0% for zero results returned, 20% for one result returned, 40% for two results returned). Errors are also reported via the computer display. Because each finger set is a separate submission, review will be possible for any set that has already been returned from IAFIS.

Figure 3:
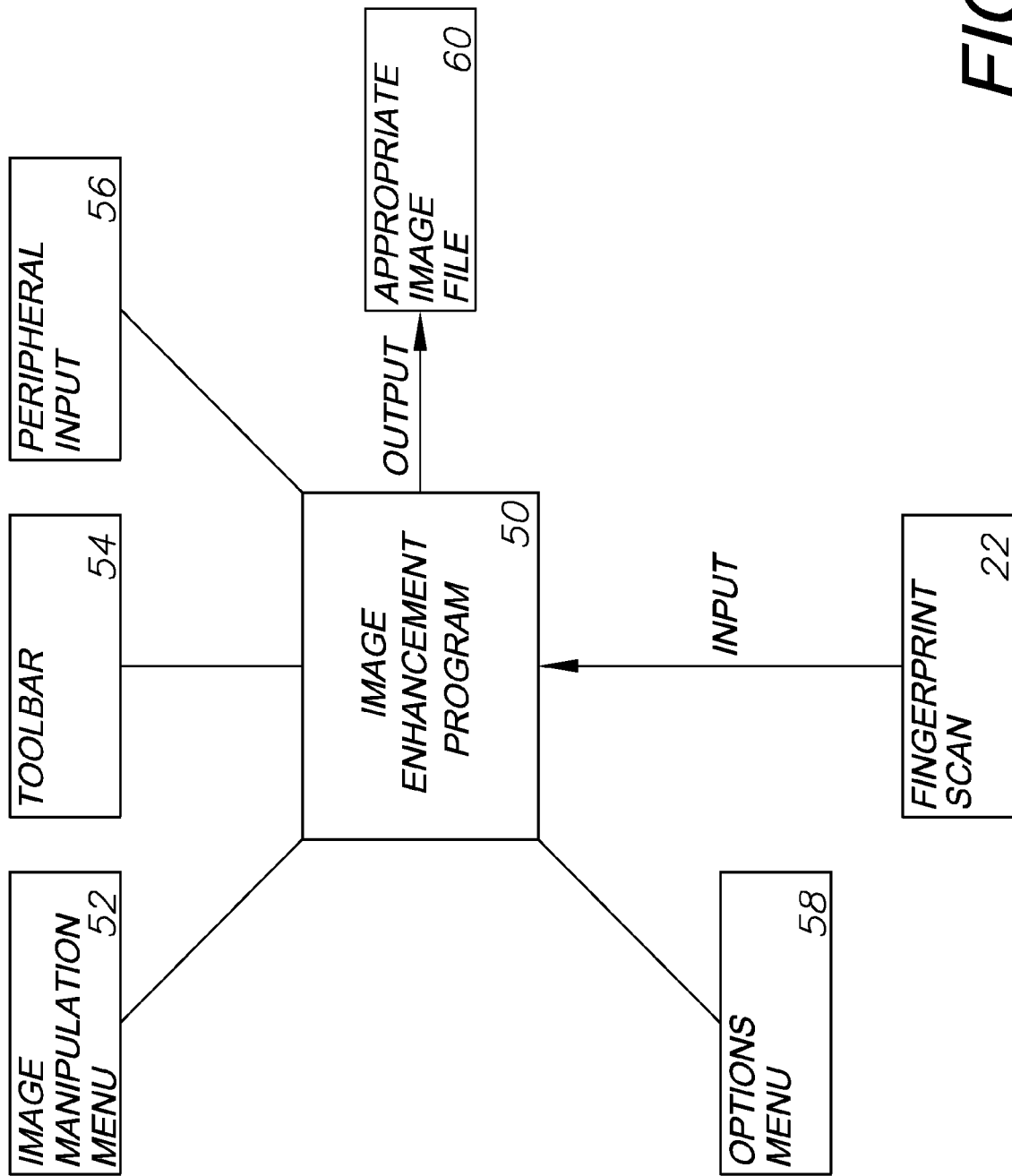
FIG. 3 is a box diagram showing the relationship between the image editing portion of the present invention and the various options available to the image editing program.

FIG. 3 is a block diagram showing the relationship between the included image enhancement program 50 and the other related components of the forensic fingerprint search system 2. The fingerprint scan 22 is automatically entered into the image enhancement program 50 so that it can be touched-up and allow minutiae points to be more easily read, and allowing greater image manipulation by the latent print examiner. The image enhancement program 50 includes an image manipulation menu 52, including image manipulation choices such as gamma adjust, detect edges, blur, emboss, reduce noise, and other options. These options are similar to those in other image editing programs such as the Adobe Photoshop program, a product of Adobe, Inc. of San Jose, Calif. The program 50 also includes a toolbar 54 with various image editing tools, the ability to use peripheral devices, such as an electronic stylus and drawing pad, attached through a peripheral input 56, and other options menus 58. The program will automatically size the output image to meet the criteria standard requirements of IAFIS and ABIS. The program 50 then outputs a saved image of the appropriate image file type 60.

The preferred embodiment as outlined above will allow a user to create a single click user point of view wherein the user merely scans fingerprints, selects what database to upload to, enters the e-mail address of the system, and clicks "send" to send the search to the database. This eliminates the user-side file management issue prevalent in the present state of the art. In the case of the FBI IAFIS database, the user merely has to click once in order to submit all five e-mails. The present invention will take the scanned fingerprints, place them into the appropriate files based on each of the five finger positions, and submit those files to the database. This essentially eliminates the user-side file management issue created by the IAFIS penetration requirement.

It is to be understood that while certain aspects of the disclosed subject matter have been shown and described, the disclosed subject matter is not limited thereto and encompasses various other embodiments and aspects. The above-mentioned steps and components are not meant to limit the use or organization of the present invention. The steps for performing the method may be performed in any logical method and the process can be used for other types of image-matching processes when viable.

Having thus described the disclosed subject matter, what is claimed as new and desired to be secured by Letters Patent is:

1. A fingerprint submission and scanning method, which includes the steps of:
   providing a fingerprint scanner adapted for scanning a fingerprint and providing a digital output corresponding to said scanned fingerprint;
   providing a computing device connected to said fingerprint scanner and including a processor, a memory storage device and a graphical user interface (GUI);
   scanning a fingerprint with said scanner and producing a scanned fingerprint digital output with said computing device by:
   selecting a fingerprint target minutiae;
   defining a target area with a perimeter around said target minutiae;
   dividing said target area into multiple segments with boundaries extending radiating outwardly from said target minutiae to said target area perimeter;
   tagging additional minutiae in said segments relative to said target minutiae;
   determining if neighboring minutiae are found within a predetermined ridge count from said target minutiae;
   tagging any found minutiae; and
   tagging and recording a lack of found minutiae if no minutiae are found within said predetermined ridge count;
   providing an image enhancer connected to said processor and said GUI, said image enhancer configured for altering said scanned fingerprint digital output and including gamma adjustment, edge detection, blur reduction, embossing and noise reduction functions;
   scanning a biometric source;
   creating a digital image corresponding to said scanned biometric source;
   providing a biometric tracking system;
   tracking said digital image with said biometric tracking system;
   selecting a database of biometrics;
   preparing said scanned biometric pursuant to compliance standards for said selected database;

enhancing said scanned biometric with said image enhancer;
producing with said processor an altered digital output corresponding to said scanned fingerprint;
submitting said scanned biometric to said selected database;
generating identification information from said scanned biometric using minutiae-to-minutiae ridge counts;
providing output comprising an identification of said scanned biometric from said database;
associating an e-mail transaction control number (TCN) with said scanned fingerprint;
conducting a search of fingerprint records in said database for said scanned fingerprint;
automatically generating multiple e-mails corresponding to biometrics of an individual subject;
performing a logic loop for each e-mail created;
providing a counter for said e-mails;
incrementing said counter with each said e-mail created; and
exiting said logic loop upon reaching a predetermined number of e-mails.

2. A biometric-based identification system for submitting fingerprint information from a subject to a remote biometric tracking database with compliance standards, said database matching subject identification, which system includes:
a fingerprint scanner adapted for scanning a fingerprint and providing a digital output corresponding to said scanned fingerprint;
a computing device connected to said fingerprint scanner and including a processor, a memory storage device and a graphical user interface (GUI), said computing device being configured for:
selecting a target minutiae;
defining a target area with a perimeter around said target minutiae;
dividing said target area into multiple segments with boundaries extending radiating outwardly from said target minutiae to said target area perimeter;
tagging additional minutiae in said segments relative to said target minutiae;
determining if neighboring minutiae are found within a predetermined ridge count from said target minutiae;
tagging any found minutiae; and
tagging and recording a lack of found minutiae if no minutiae are found within said predetermined ridge count;
an image enhancer connected to said processor and said GUI, said image enhancer configured for altering said scanned fingerprint digital output and including gamma adjustment, edge detection, blur reduction, embossing and noise reduction functions;
said computing device configured for creating a digital image corresponding to a scanned biometric source; and
said computing device configured for:
selecting a biometric tracking system database and providing output to said selected biometric tracking system;
preparing said scanned biometric pursuant to compliance standards for said selected database;
enhancing said scanned biometric with said image enhancer;
producing an altered digital output corresponding to said scanned fingerprint;
submitting said scanned biometric to said selected database;
generating identification information from said scanned biometric using minutiae-to-minutiae ridge counts;
providing output comprising an identification of said scanned biometric from said database;
associating an e-mail transaction control number (TCN) with said scanned fingerprint;
conducting a search of fingerprint records in said database for said scanned fingerprint;
automatically generating multiple e-mails corresponding to biometrics of an individual subject;
performing a logic loop for each e-mail created;
providing a counter for said e-mails;
incrementing said counter with each said e-mail created; and
exiting said logic loop upon reaching a predetermined number of e-mails.

\* \* \* \* \*